(12) United States Patent
Jung et al.

(10) Patent No.: US 10,933,889 B1
(45) Date of Patent: Mar. 2, 2021

(54) VEHICLE AND CONTROL METHOD THEREOF

(71) Applicants: Hyundai Motor Company, Seoul (KR); Kia Motors Corporation, Seoul (KR)

(72) Inventors: Seul-A Jung, Gyeonggi-do (KR); Donghyuk Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/659,926

(22) Filed: Oct. 22, 2019

(30) Foreign Application Priority Data

Aug. 14, 2019 (KR) .................. 10-2019-0099529

(51) Int. Cl.
*B60Q 1/00* (2006.01)
*B60W 50/14* (2020.01)
*B60Q 9/00* (2006.01)
*B60W 30/095* (2012.01)
*B60W 50/00* (2006.01)

(52) U.S. Cl.
CPC ............. *B60W 50/14* (2013.01); *B60Q 9/008* (2013.01); *B60W 30/095* (2013.01); *B60W 2050/0089* (2013.01); *B60W 2420/42* (2013.01)

(58) Field of Classification Search
CPC ............... B60W 50/14; B60W 30/095; B60W 2420/42; B60W 2050/0089; B60Q 9/008; B60C 23/0401; B60K 31/18; B60K 2370/21; B60R 1/00; B60R 2300/301; B60R 2300/302; B60R 11/04; B60R 2300/207; B60R 2300/105; B60R 11/0235; B60R 2300/305; G08G 1/166; G08G 1/167; B60L 2250/16
USPC .................. 340/438, 435, 436, 937, 903
See application file for complete search history.

(56) References Cited

U.S. PATENT DOCUMENTS

| | | | |
|---|---|---|---|
| 7,835,854 B2 * | 11/2010 | Yamamoto | B60C 23/0401 701/117 |
| 2004/0016870 A1 * | 1/2004 | Pawlicki | B60W 10/20 250/208.1 |
| 2009/0109062 A1 * | 4/2009 | An | G06Q 20/3255 340/932.2 |
| 2015/0109444 A1 * | 4/2015 | Zhang | H04N 7/188 348/148 |
| 2018/0079359 A1 * | 3/2018 | Park | B60Q 1/525 |

(Continued)

*Primary Examiner* — Anh V La
(74) *Attorney, Agent, or Firm* — Mintz Levin Cohn Ferris Glovsky and Popeo, P.C.; Peter F. Corless

(57) ABSTRACT

A vehicle and a control method for providing a notification of a collision of a vehicle and providing information on an object causing the collision are provided. The vehicle includes a communication unit communicating with a user terminal, a sensor acquiring distance information between the vehicle and at least one surrounding object and acceleration information of the vehicle, and a camera acquiring a vehicle surrounding image. A controller starts acquiring the vehicle surrounding image when the distance between the vehicle and the at least one surrounding object is less than a predetermined distance, acquires information about the at least one surrounding object approaching the vehicle and transmits the information about the at least one surrounding object to the user terminal.

14 Claims, 9 Drawing Sheets

(56) References Cited

U.S. PATENT DOCUMENTS

2018/0154908 A1* 6/2018 Chen ................ G07C 5/0858
2019/0088135 A1* 3/2019 Do .................. G05D 1/0055

* cited by examiner

VEHICLE AND CONTROL METHOD THEREOF

CROSS-REFERENCE TO RELATED APPLICATION

This application is based on and claims priority under 35 U.S.C. § 119 to Korean Patent Application No. 10-2019-0099529, filed on Aug. 14, 2019, the disclosure of which is incorporated herein by reference.

BACKGROUND

1. Field of the Invention

The present invention relates to a vehicle, and more particularly, to a vehicle that acquires an image around the vehicle and a control method thereof.

2. Description of the Related Art

In recent years, a vehicle black box (e.g., vehicle video recording device) has been commercialized and used to determine the cause of a traffic accident. The black box is installed inside the vehicle to record an image of the outside of the vehicle by capturing the image while driving or stopping the vehicle. The vehicle black box is generally formed to include a front camera, a rear camera and a processor configured to operate the cameras. The controller may be configured to store the driving image information transmitted from the front camera and the rear camera for a set time in a storage time unit set in the internal memory.

Meanwhile, a vehicle video recording apparatus included in a vehicle provides only a simple video recording and playback function. In addition, the user may set up the system to use the captured information as evidence in case of an accident. On the other hand, when a collision occurs in the vehicle, the user may simply be notified that the impact detection recording has been stored. In this case, it may be difficult for the user to immediately identify the cause of the collision.

SUMMARY

Therefore, the present disclosure provides a vehicle and a control method for providing a notification of a collision of a vehicle and providing information regarding an object causing the collision.

It is an aspect of the present invention to provide a vehicle that may include: a communication unit configured to communicate with a user terminal; a sensor configured to acquire distance information between the vehicle and at least one surrounding object and acceleration information of the vehicle; a camera configured to acquire a vehicle surrounding image; and a controller configured to start acquiring the vehicle surrounding image when the distance between the vehicle and the at least one surrounding object is less than a predetermined distance, acquire information regarding the at least one surrounding object approaching the vehicle and transmit the information regarding the at least one surrounding object to the user terminal.

When the at least one surrounding object is another vehicle, the controller may be configured to acquire license plate information of the other vehicle and transmit the license plate information to the user terminal. When the controller fails to acquire license plate information of the other vehicle, the controller may be configured to acquire vehicle type information of the other vehicle and transmit the vehicle type information to the user terminal. When there are a plurality of surrounding objects, the controller may be configured to acquire information of one surrounding object closest to the vehicle and transmit the information of one surrounding object to the user terminal.

The controller may be configured to acquire information of the surrounding object located at the center of the surrounding image and transmit the information to the user terminal in response to determining that the vehicle and the surrounding object collide based on the acceleration information. The at least one surrounding object may include a person and the controller may be configured to acquire the identification information of the person based on the facial expression of the person included in the vehicle surrounding image and transmit the identification information to the user terminal.

The controller may further be configured to determine a collision estimated location information of the vehicle based on the acceleration information and transmit the collision estimated location information and the information of the surrounding object to the user terminal. The controller may be configured to acquire the vehicle surrounding image until the completion of parking of the vehicle in response to determining that the vehicle is in a parking state and output a message including an inquiry requesting an extension of the vehicle surrounding image acquisition time to the user terminal when the parking completion time of the vehicle exceeds a predetermined time range.

It is another aspect of the present invention to provide a control method of a vehicle that may include: acquiring distance information between the vehicle and at least one surrounding object and acceleration information of the vehicle; acquiring a vehicle surrounding image; starting acquiring the vehicle surrounding image when the distance between the vehicle and the at least one surrounding object is less than a predetermined distance; and acquiring information regarding the at least one surrounding object approaching the vehicle and transmitting the information regarding the at least one surrounding object to the user terminal.

The acquiring of information regarding the at least one surrounding object approaching the vehicle and transmitting the information regarding the at least one surrounding object to the user terminal may include: when the at least one surrounding object is another vehicle, acquiring a license plate information of the other vehicle and transmitting the license plate information to the user terminal. In response to failing to acquire the license plate information of the other vehicle, the method may include acquiring a vehicle type information of the other vehicle and transmitting the vehicle type information to the user terminal.

When a plurality of surrounding objects are detected, the method may include acquiring information of one surrounding object closest to the vehicle and transmitting the information of one surrounding object to the user terminal. The method may further include acquiring information regarding the surrounding object located at the center of the surrounding image and transmitting the information to the user terminal in response to determining that the vehicle and the surrounding object collide based on the acceleration information.

The at least one surrounding object may include a person and thus, the method may include acquiring the identification information of the person based on the facial expression of the person included in the vehicle surrounding image and transmitting the identification information to the user terminal.

The control method may further include: determining a collision estimated location information of the vehicle based on the acceleration information, and transmitting the collision estimated location information and the information of the surrounding object to the user terminal. The acquiring of the vehicle surrounding image may include: acquiring the vehicle surrounding image until the completion of parking of the vehicle in response to determining that the vehicle is in the parking state and outputting a message including an inquiry requesting an extension of the vehicle surrounding image acquisition time to the user terminal when the parking completion time of the vehicle exceeds a predetermined time range.

BRIEF DESCRIPTION OF THE DRAWINGS

These and/or other aspects of the invention will become apparent and more readily appreciated from the following description of the exemplary embodiments, taken in conjunction with the accompanying drawings of which.

DETAILED DESCRIPTION

Figure 1:
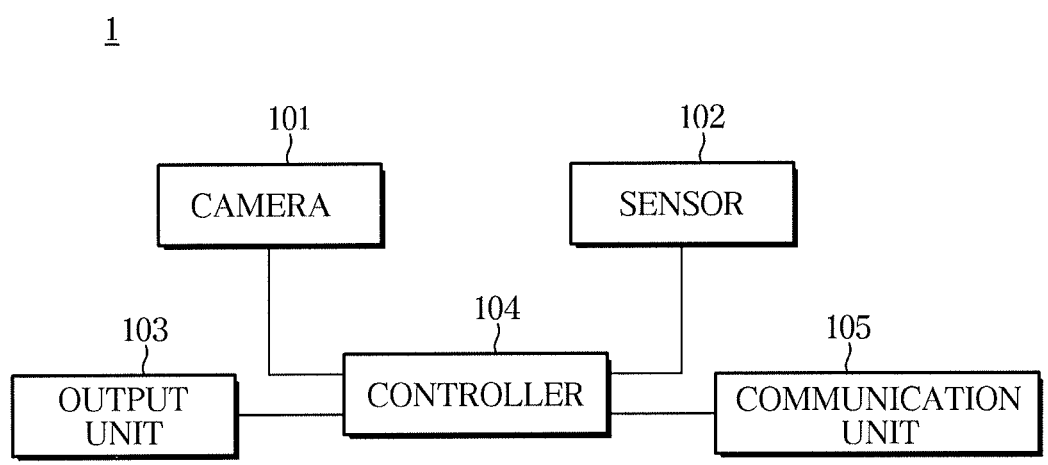
FIG. 1 is a control block diagram of a vehicle according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like numerals refer to like elements throughout the specification. Not all elements of exemplary embodiments of the present invention will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network. It will be further understood that the terms "comprises" and/or "comprising," when used in this specification, identify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it will be understood that, when a member is referred to as being "on/under" another member, it can be directly on/under the other member, or one or more intervening members may also be present. The terms including ordinal numbers like "first" and "second" may be used to explain various components, but the components are not limited by the terms. The terms are only for the purpose of distinguishing a component from another. As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise. Hereinafter, the operating principles and exemplary embodiments of the disclosure will be described with reference to the accompanying drawings.

FIG. 1 is a control block diagram of a vehicle according to an exemplary embodiment. The vehicle 1 according to an exemplary embodiment may include a camera 101, a sensor 102, an output unit 103, a communication unit 105, and a controller 104. The controller 104 may be configured to operate the other elements of the vehicle 1. The camera 101 may be configured to acquire a vehicle surrounding image. The vehicle surrounding image may refer to a black box image used for an accident analysis when a vehicle accident occurs. The camera 101 may be disposed on the front, rear, and lateral sides of the vehicle to acquire images.

The camera installed on the vehicle may include a charge-coupled device (CCD) camera or a complementary metal-oxide semiconductor (CMOS) color image sensor. Particularly, the CCD and the CMOS may refer to a sensor configured to convert light received through a lens of a camera into an electric signal. The CCD camera refers to an apparatus configured to convert an image into an electric signal using a charge-coupled device. In addition, a CMOS image sensor (CIS) refers to a low-consumption and low-power type image pickup device having a CMOS structure, and serves as an electronic film of a digital device. In general, the CCD has a sensitivity superior than that of the CIS and thus is widely used in the vehicle, but the present invention is not limited thereto.

The sensor 102 may be configured to acquire distance information between the vehicle and at least one surrounding object and acceleration information of the vehicle. In particular, the sensor 102 may include a radar, a lidar, an acceleration sensor. The radar may be provided as a sensor configured to emit electromagnetic waves in a range of microwaves (e.g., microwaves with a wavelength of about 10 cm to 100 cm) to an object, receive electromagnetic waves reflected from the object, and detect the distance from the object, direction, and altitude of the object. The lidar may be provided as a sensor configured to emit a laser pulse to a surrounding object and receive the laser, upon being reflected from the surrounding object and returning thereto, to measure the distance to the object and the like so that the surrounding image is represented in detail.

The acceleration sensor may be configured to measure the longitudinal acceleration, the lateral acceleration, and the vertical acceleration of the vehicle. According to an exemplary embodiment, the acceleration sensor may be implemented as a gyro sensor. The output unit 103 may be configured to output an image acquired by the vehicle.

According to an exemplary embodiment, the output unit 103 may be implemented in a display form. The display may be configured to output a screen, which may be provided as a Cathode Ray Tube (CRT), Digital Light Processing (DLP) panel, Plasma Display Panel (PDP), Liquid Crystal Display (LCD) panel, Electro Luminescence (EL) panel, Electrophoretic Display (EPD) panel, Electrochromic Display (ECD) panel, Light Emitting Diode (LED) panel, or Organic Light Emitting Diode (OLED) panel, etc., but is not limited thereto.

The communication unit 105 may be configured to communicate with the user terminal. A user terminal may be implemented as a computer or a portable terminal that can access a device via a network. Particularly, the computer may include, for example, a laptop equipped with a web browser, a desktop, a tablet personal computer (PC), a slate PC, and the like. The portable terminal may be, for example, a wireless communication device that ensures portability and mobility, and may include all types of handheld based wireless communication devices such as a personal communication system (PCS), a global system for mobile communications (GSM), a personal digital cellular (PDC), a personal handyphone system (PHS), and a Personal Digital Assistant (PDA), International Mobile Telecommunication (IMT)-2000, Code Division Multiple Access (CDMA)-2000, W-Code Division Multiple Access (W-CDMA), Wireless Broadband Internet (WiBro) terminal, Smart Phone and may include wearable devices such as watches, rings, bracelets, anklets, necklaces, glasses, contact lenses, or head-mounted-devices (HMDs).

The communication unit 105 may include one or more components that enable communication with an external device, for example, at least one of a short-range communication module, a wired communication module, and a wireless communication module. The short-range communication module may include various short-range communication modules that may transmit and receive signals in a short distance using a wireless communication network, for example, a Bluetooth module, an infrared communication module, a radio frequency identification (RFID) communication module, a wireless local access network (WLAN) communication module, a near field communication (NFC) communication module, a Zigbee communication module, and the like.

The wired communication module may include not only various wired communication modules, such as a controller area network (CAN) communication module, a local area network (LAN) communication module, a wide area network (WAN) module, or a value added network (VAN) module, but also various cable communication modules, such as a universal serial bus (USB), a high definition multimedia interface (HDMI), a digital visual interface (DVI), a recommended standard 232 (RS-232), power line communication, or plain old telephone service (POTS).

The wireless communication module may include various wireless communication modules for supporting various wireless communication methods, such as a Wifi module, a wireless broadband (Wibro) module, a global system for mobile communication (GSM), a code division multiple access (CDMA), a wideband code division multiple access (WCDMA), universal mobile telecommunications system (UMTS), a time division multiple access (TDMA), a long term evolution (LTE), and the like.

Moreover, the controller 104 may be configured to start acquiring the vehicle surrounding image when the distance between the vehicle and the at least one surrounding object is less than a predetermined distance. As described above, the sensor may be configured to acquire a distance between the vehicle and the surrounding object. In response to determining that the surrounding object is approaching to the vehicle based on the distance between the vehicle and the surrounding object, the controller may be configured to acquire the vehicle surrounding image.

The controller 104 may be configured to acquire information about at least one of the surrounding object approaching the vehicle and transmit the information to the user terminal. The surrounding object information may be license plate information of the vehicle or vehicle type information of the vehicle as described below. Detailed description thereof will be described later. If at least one surrounding object is another vehicle (e.g., a surrounding vehicle), the controller 104 may be configured to acquire license plate information of the other vehicle and transmit the license plate information to the user terminal.

When the controller 104 fails to acquire license plate information of another vehicle (e.g., surrounding vehicle), the controller 104 may be configured to derive vehicle type information of the other vehicle and transmit the same to the user terminal. When there are a plurality of surrounding objects, the controller 104 may be configured to acquire information about one surrounding object determined to be closest to the vehicle and transmit the information to the user terminal. In particular, the controller 104 may be configured to specify an object closest to the vehicle. The controller 104 may thus be configured to operate the camera to focus on an object closest to the vehicle and acquire a vehicle surrounding image.

In response to determining that the vehicle and the surrounding object collide with each other based on the acceleration information, the controller 104 may be configured to acquire information of the surrounding object located in the center of the surrounding image and transmit the information to the user terminal. In particular, when the ADAS system notification is not detected at the time of impact detection, the controller 104 may be configured to focus on a center object of the recorded rear camera image and acquire a vehicle surrounding image.

When a plurality of vehicles and the like are detected, the controller 104 may be configured to focus on an object having a closest distance between vehicles identified by the radar and acquire a vehicle surrounding image. In other words, in a collision situation of a vehicle, since a surrounding object included in the surrounding image is likely to be involved in the collision of the vehicle, the controller may be configured to acquire information of the surrounding object located in the center of the surrounding image and transmit the information to the user terminal. At least one surrounding object may include a person. Accordingly, the controller 104 may be configured to acquire identification information of the person based on the facial expression of the person included in the vehicle surrounding image and transmit the identification information to the user terminal.

According to an exemplary embodiment, the process of acquiring identification information of a person may include an operation of an algorithm for recognizing a person's face. The controller 104 may be configured to determine collision estimated location information of the vehicle based on the acceleration information. Since the acceleration information may be matched with the information of the force received by the vehicle, the vehicle may be configured to determine the expected position where the collision is expected to occur based on the acceleration information.

Further, the controller 104 may be configured to transmit collision estimated location information and information regarding the surrounding object to the user terminal. According to an exemplary embodiment, the controller 104 may be configured to transmit a message to the user terminal, such as "anticipation of collision on the front right". In response to determining that the vehicle is in a parking state, the controller 104 may be configured to acquire the vehicle surrounding image until the completion of parking of the vehicle.

Particularly, the controller 104 may be configured to acquire the vehicle surrounding image for a predetermined time when the vehicle starts parking. When the parking completion point of the vehicle exceeds the predetermined time range, the controller 104 may be configured to output a message including an inquiry requesting an extension of the vehicle surrounding image acquisition time to the user terminal. In other words, the user may select whether to extend the time period for acquiring the vehicle surrounding image after the acquisition time has elapsed.

The controller may be implemented in a memory (not shown) configured to store data for an algorithm or a program that reproduces the algorithm for executing the operation of components in the vehicle, and a processor (not shown) configured to perform the above-described operation using the data stored in the memory. In particular, the memory and the processor may be implemented as separate chips. Alternatively, the memory and the processor may be implemented in a single chip.

At least one component may be added or deleted to correspond to the performance of the components of the vehicle illustrated in FIG. 1. In addition, it will be readily understood by those skilled in the art that the mutual position of the components may be changed corresponding to the performance or structure of the system. Meanwhile, each component illustrated in FIG. 1 refers to software and/or hardware components such as Field Programmable Gate Array (FPGA) and Application Specific Integrated Circuit (ASIC).

Figure 2A:
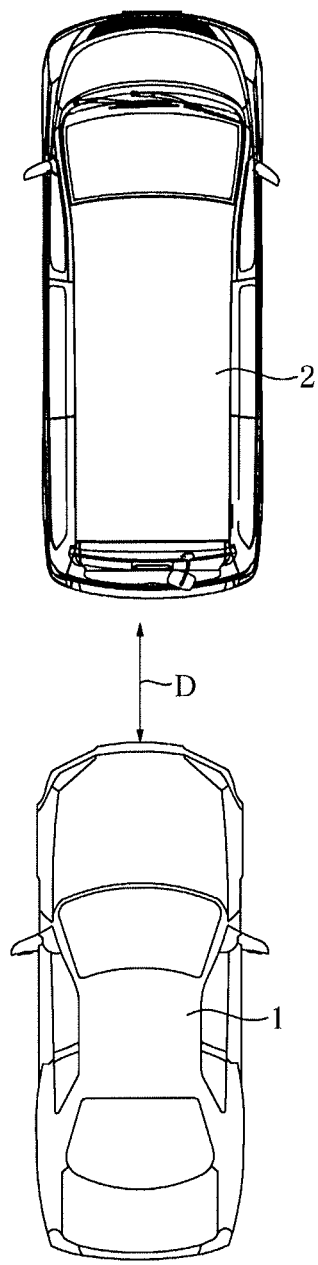
FIGS. 2A, 2B, and 2C are diagrams for describing an operation of acquiring information of a surrounding object, according to an exemplary embodiment.
Figure 2B:
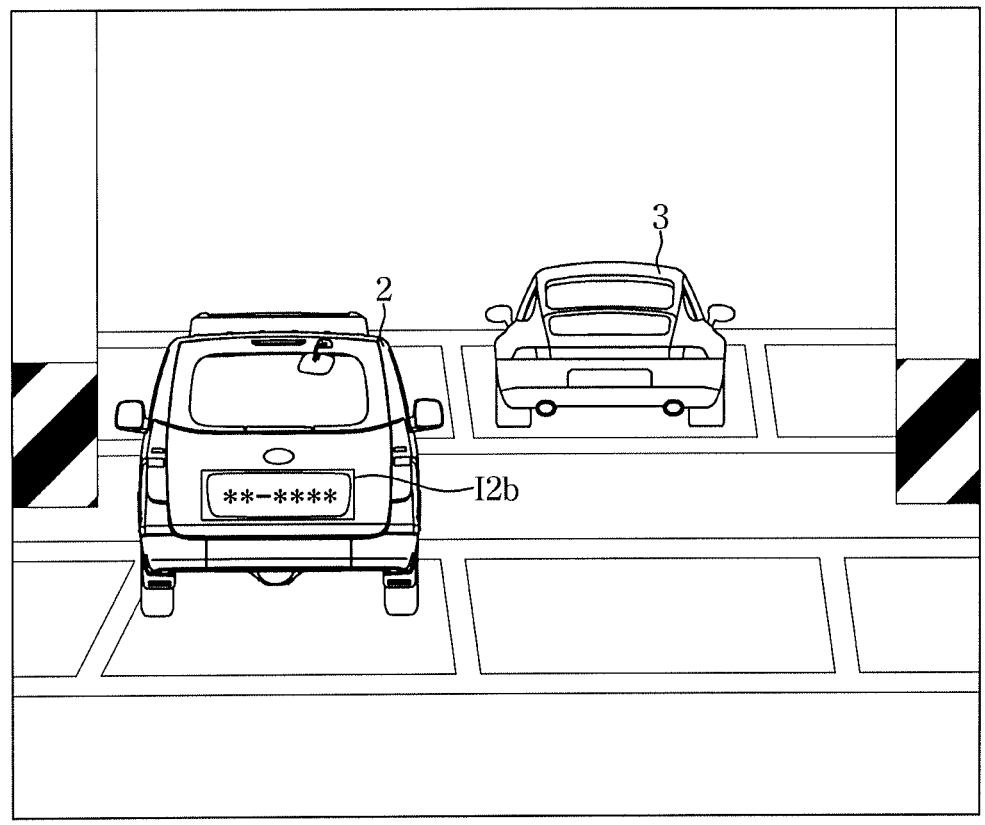
Figure 2C:
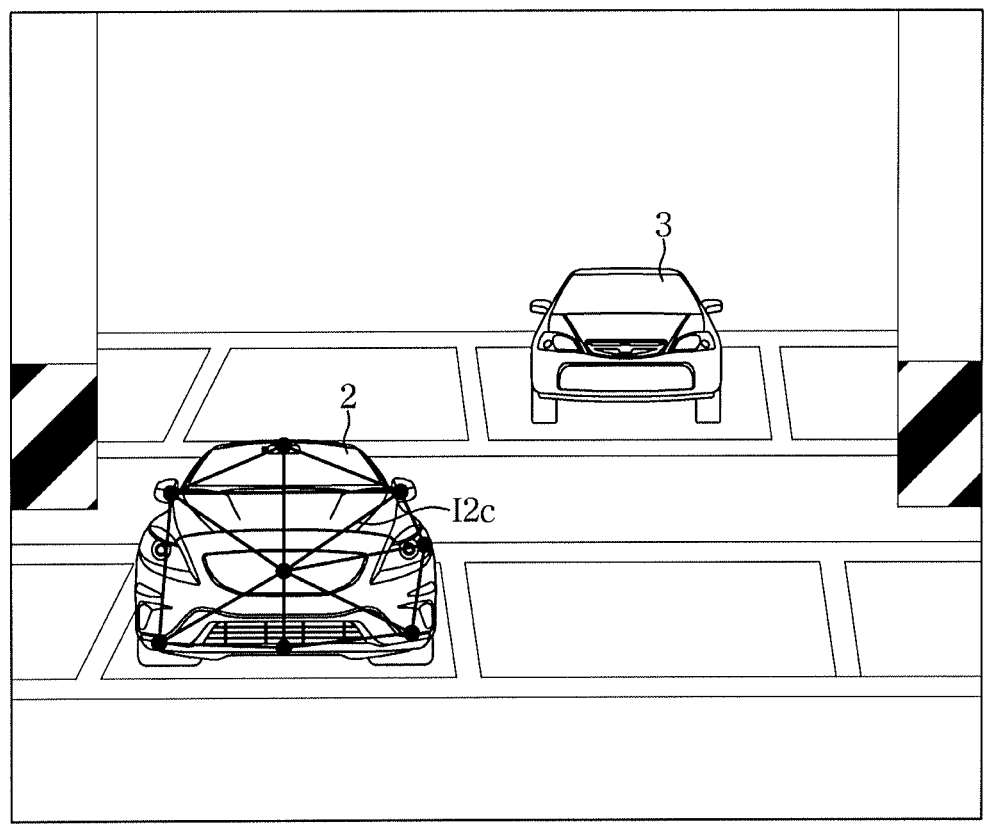

FIGS. 2A, 2B, and 2C are diagrams for describing an operation of acquiring information of a surrounding object, according to an exemplary embodiment. Referring to FIG. 2A, when a distance between a vehicle and the at least one surrounding object 2 is less than a predetermined distance D, the vehicle may be configured to begin acquiring a vehicle surrounding image and acquire the information of the at least one surrounding object approaching the vehicle. In FIG. 2A, a case in which the surrounding object 2 is another vehicle (e.g., a surrounding vehicle) is described as an example.

According to an exemplary embodiment, at the time of impact detection, when a forward collision warning system (FCW) is detected, or when the forward collision avoidance assist (FCA) is detected but the brake is not automatically operated under the condition that the driver's intention is reflected, the above-described operation may be implemented. In other words, the brake is not engaged immediately due to driver distraction. Accordingly, the front camera may be configured to detect the object 2 in front of the vehicle (e.g., subject vehicle), and the radar may be configured to determine the distance D between vehicles (e.g., the subject vehicle and the surrounding vehicle). The controller may be configured to activate the forward collision warning system when the distance D is less than the predetermined distance.

Referring to FIG. 2B, an operation of acquiring information of a surrounding object by a controller is described. The controller may be configured to operate the camera to focus on the surrounding objects (2, 3) and acquire an image. When there are a plurality of surrounding objects (2, 3), the controller may be configured to acquire information about one surrounding object (2) detected to be closest to the vehicle and transmit the information to the user terminal.

In particular, when a plurality of vehicles are detected, the controller may be configured to focus on the object 2 having the closest distance between vehicles identified by the radar and acquire a surrounding image. In FIG. 2B, since the other vehicle 2 is located close to the vehicle, the controller may be configured to focus on the other vehicle 2 and acquire the information of the other vehicle 2. Meanwhile, according to an exemplary embodiment, when at least one surrounding object is another vehicle, license plate information I2b of the other vehicle may be acquired and transmitted to the user terminal.

In the case of FIG. 2A, the vehicle may be configured to acquire license plate information I2b of other vehicle 2. If the corresponding vehicle may be clearly identified, the controller may first be configured to detect the license plate I2b using a license plate recognition algorithm. In addition, the controller may be configured to additionally guide the corresponding information when the detailed information is retrieved using the server search. In FIG. 2A, when a controller acquires license plate information of the other vehicle 2 and the vehicle collides with another vehicle or a collision is expected, the controller may be configured to transmit the information to the user terminal.

FIG. 2C is a diagram for describing an operation when the controller fails to acquire license plate information of another vehicle. Referring to FIG. 2C, when the controller fails to acquire license plate information of another vehicle (e.g., surrounding vehicle), the controller may be configured to derive vehicle type information I2c of another vehicle and transmit the information to the user terminal.

In particular, when it is impossible to clearly identify the corresponding vehicle, the controller may be configured to communicate with the server to analyze information regarding the color of the other vehicle and acquire the corresponding information by searching for the vehicle type in the server. The controller may be configured to determine the information of the vehicle by tracking images before and after the impact detection time, based on the detection of information on the vehicle. In other words, the server may be configured to store information regarding vehicle types and based on the acquired image, a comparison of image information with information available on the server may be used to determine the vehicle type.

According to an exemplary embodiment, when the rear blind spot detection system (BSD) is detected at the time of impact detection, the controller may be configured to focus on an object detected in a corresponding direction of the recorded rear camera image and acquire a surrounding image. According to an exemplary embodiment, when the right blind spot detection system operates, an analysis process may be performed on an object that has been approached from the right side. In addition, when a plurality of vehicles are detected, the vehicle surrounding image may be acquired by focusing on the object having the closest distance between the vehicles identified by the radar. In other words, the focus may be on the surrounding vehicle out of the plurality of vehicle that is closest to the subject vehicle.

Meanwhile, the description of the present invention shown in FIGS. 2A, 2B, and 2C is merely an example for describing the operation of the present invention, and there is no limitation in the operation of acquiring the vehicle surrounding image by the vehicle.

Figure 3:
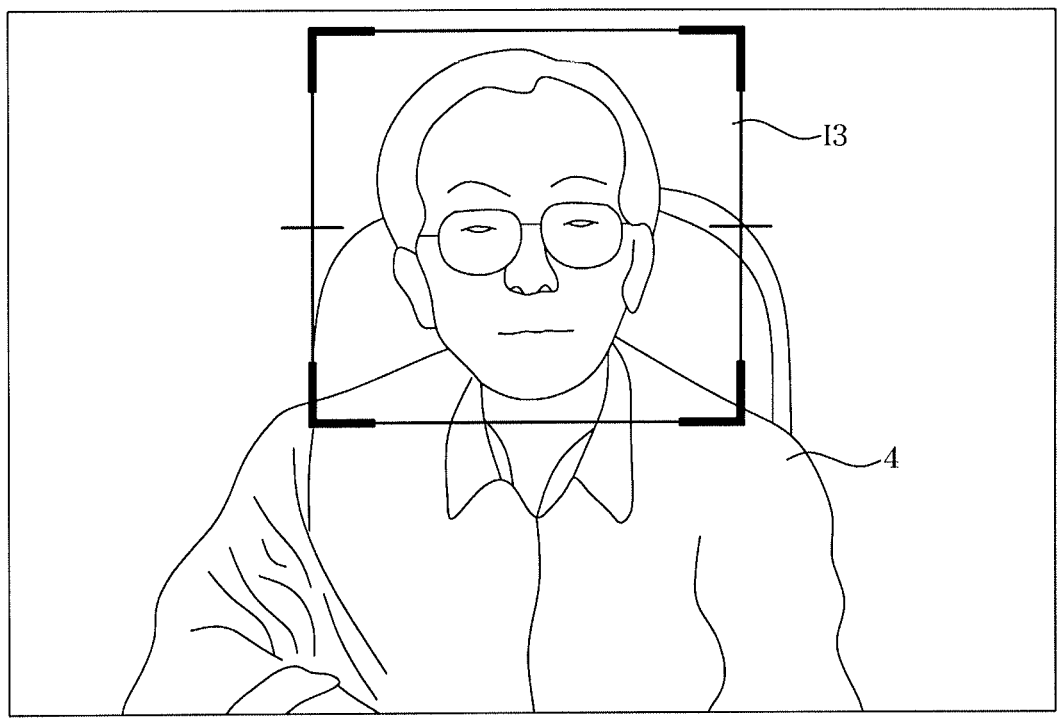
FIG. 3 is a diagram for describing an operation when a surrounding object is a person, according to an exemplary embodiment.

FIG. 3 is a diagram for describing an operation when a surrounding object is a person, according to an exemplary embodiment. FIGS. 2A, 2B and 2C, the operation when the surrounding object is another vehicle has been described. When a vehicle collision is expected, a general surrounding object will be a vehicle, but a person may also correspond to a surrounding object 4 involved in the collision of the vehicle. In other words, at least one surrounding object may include a person.

Accordingly, the controller may be configured to acquire identification information of the person based on the facial expression of the person included in the vehicle surrounding image and transmit the identification information to the user terminal. The controller may be configured to detect a face of the pedestrian using a face recognition algorithm for a person (I3). In particular, the controller may be configured to communicate with the server and receive information through face recognition such as gender and estimated age. In FIG. 3, the controller shows an exemplary embodiment of detecting a person face to derive information (I3).

In addition, when face recognition is difficult, the controller may be configured to acquire approximate information about a person using a wearing costume (e.g., user outfit or clothing). The surrounding object may also be another object such as an animal, not a vehicle. In this case, the controller may be configured to estimate the corresponding object through a server search for the photographed object. In other words, as described above, the server may include information regarding animal types and a matching process may be executed to determine the animal acquired in the image. Meanwhile, the operation described with reference to FIG. 3 is merely an operation for identifying a person, and there is no limitation on an operation for identifying a surrounding object except for a vehicle and transmitting corresponding information to a user terminal.

Figure 4:
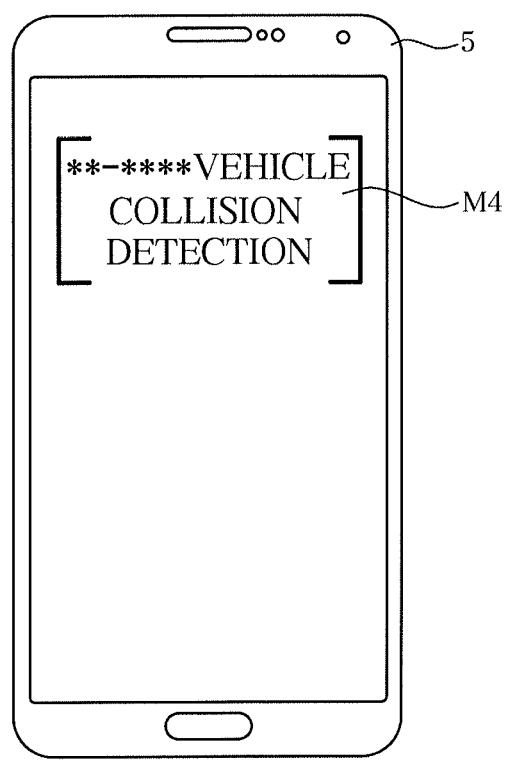
FIG. 4 is a diagram for describing an operation of outputting object information, according to an exemplary embodiment.

FIG. 4 is a diagram for describing an operation of outputting object information, according to an exemplary embodiment. Referring to FIG. 4, the controller may be configured to acquire information about the surrounding object and transmit the information to the user terminal 5. Specifically, FIG. 4 shows that the license plate information M4 of the vehicle is output from the surrounding object information derived by the above-described method. In FIG. 4, a message M4 of "- vehicle collision detection" may be output to the user terminal 5** where there asterisks indicate license plate information.

In FIG. 4, the license plate information of the vehicle is output, but as described above, the controller may be unable to acquire license plate information of another vehicle. In this case, the controller may be configured to derive vehicle type information of the other vehicle and transmit the vehicle type information to the user terminal. The controller may be configured to determine collision estimated location information of the vehicle based on the acceleration information. In other words, collision prediction information of a collision prediction object may be acquired using a sensor provided in the vehicle. However, when the surrounding object actually collides the vehicle, the controller may be configured to determine whether the vehicle collides based on the acceleration information, and determine the direction in which the collision occurs based on the acceleration direction. Collisions may be subdivided into forward, rear left, rear right and rear centers.

According to an exemplary embodiment, the controller may be configured to output the collision detection prediction position and the collision occurrence information such as "forward collision prediction" or "forward collision occurrence" while transmitting collision prediction information to the user terminal. In addition, when the surrounding object is a person, if the person's information is identified, the person's identification information may be transmitted to the user terminal.

Figure 5:
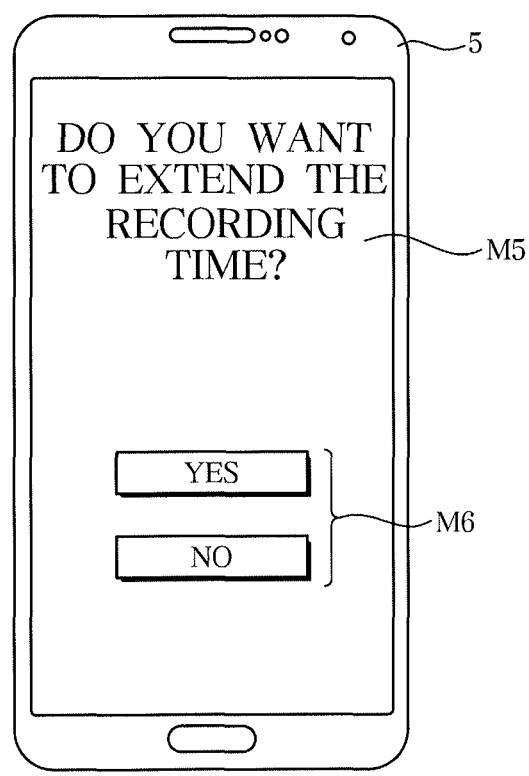
FIG. 5 is a diagram for describing an operation of outputting a message including an inquiry requesting an extension of the vehicle surrounding image acquisition time, according to an exemplary embodiment.

FIG. 5 is a diagram for describing an operation of outputting a message including an inquiry requesting an extension of the vehicle surrounding image acquisition time, according to an exemplary embodiment. Referring to FIG. 5, a message M5 output to the user terminal 5 in a parking state of a vehicle is shown.

In response to determining that the vehicle is in a parking state, the controller may be configured to acquire the vehicle surrounding image until the completion of parking of the vehicle. The controller may be configured to determine that the vehicle is in a parking state based on a reverse gear being engaged and a low speed travel. In addition, since the vehicle may collide frequently during parking, the vehicle may be configured to acquire the vehicle surrounding image until the completion of parking of the vehicle.

On the other hand, when a substantial amount of time is required for parking and the completion time of parking of the vehicle exceeds a predetermined time range, the controller may be configured to output a message M5 including an inquiry requesting an extension of the vehicle surrounding image acquisition time to the user terminal 5.

FIG. 5 shows that the controller outputs a message M5 such as "Do you want to extend the recording time?" to the user terminal. According to an exemplary embodiment, message prompting may be output when the ADAS system is deactivated. The controller may be configured to analyze an object corresponding to both the front and rear of the vehicle based on the acquired surrounding image.

However, if it is difficult to acquire an image to detect the progress of the analysis of the surrounding object, the controller may be configured to determine the intention of extending the recording setting time during parking to the owner of the vehicle through the user terminal set. In FIG. 5, an interface such as "Yes/No" may be output to receive an input of whether the user extends the recording time (M6).

When the user enters "yes", the controller may be configured to increase the vehicle surrounding image acquisition time. When the user enters "no", the controller may be configured to stop acquiring the surrounding image of the vehicle. On the other hand, the message output to the user terminal described in FIGS. 4 and 5 is only an exemplary embodiment of the present invention, there is no limitation in the form of the message output to the user terminal.

Figure 6:
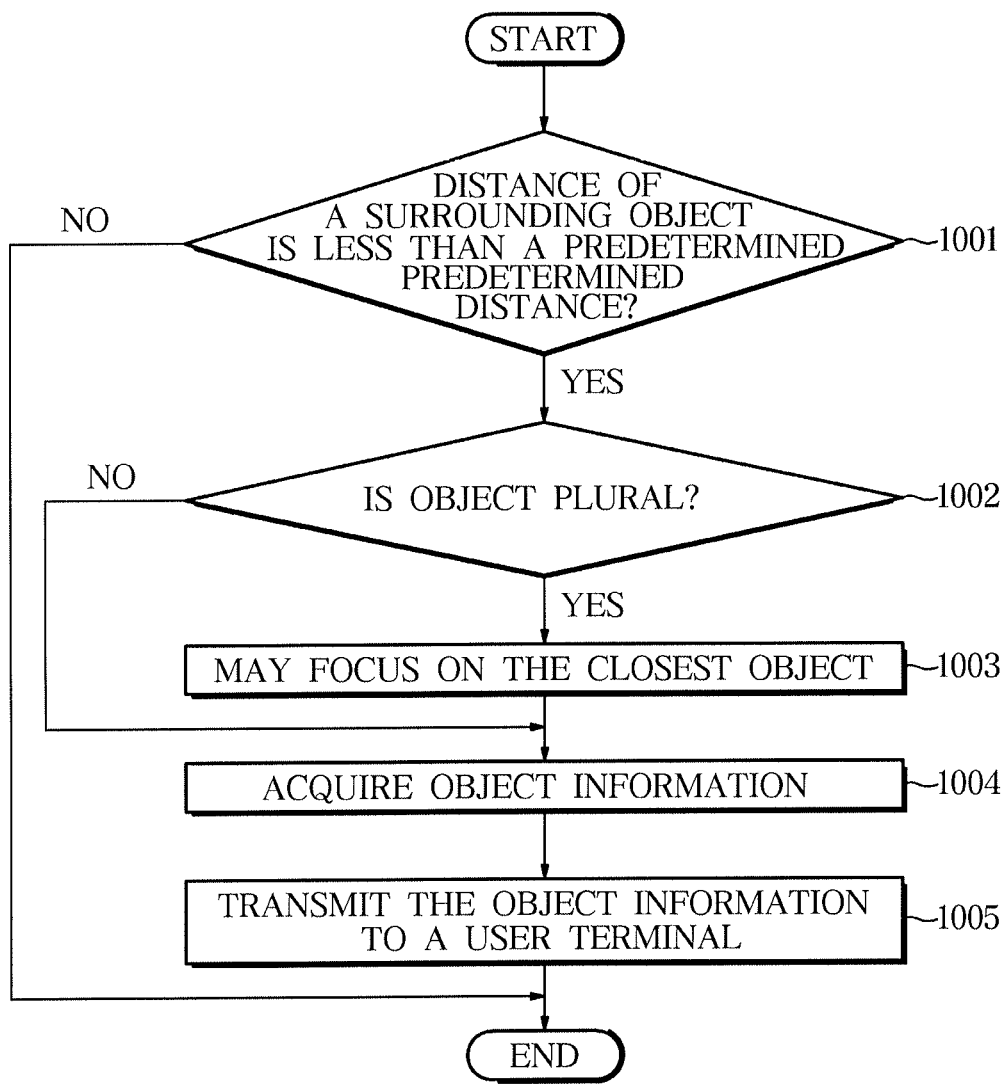
FIGS. 6 and 7 are flowcharts according to an exemplary embodiment.
Figure 7:
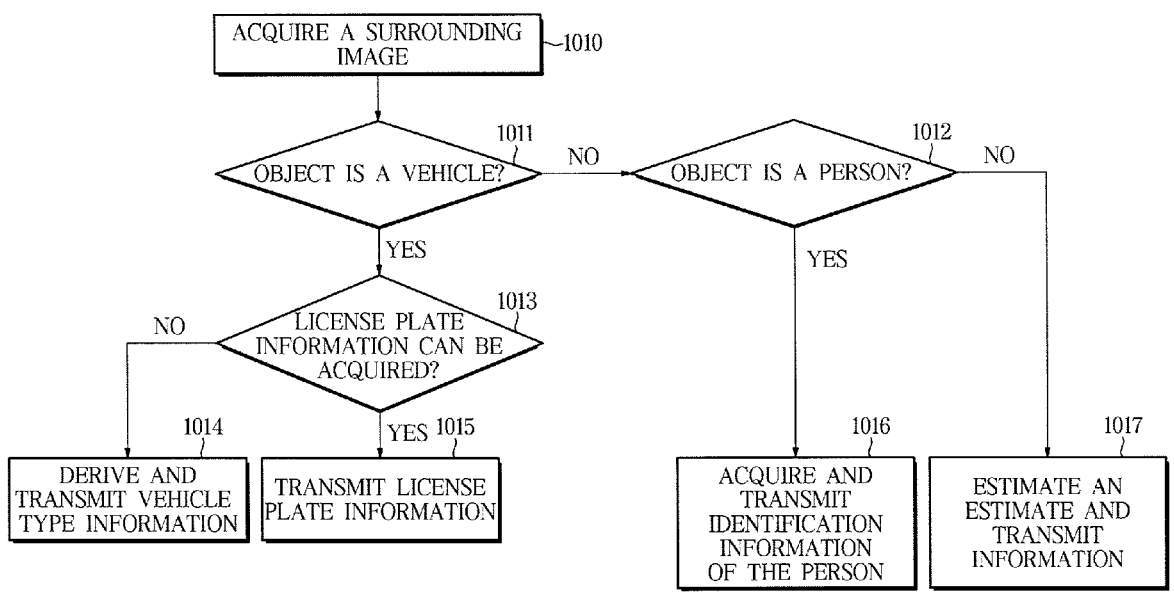

FIGS. 6 and 7 are flowcharts according to an exemplary embodiment. Referring to FIG. 6, the controller may be configured to determine whether a distance of a surrounding object is less than a predetermined distance (1001). In addition, when a plurality of surrounding objects are detected, the controller may be configured to focus on the closest object (1003) and acquire object information (1004). When only a single surrounding object is detected, object information may be immediately acquired (1004). On the other hand, the controller may be configured to transmit the derived object information to the user terminal (1005).

Referring to FIG. 7, the controller may be configured to acquire a surrounding image (1010). When the object is a vehicle (1011) and license plate information is capable of being acquired (1013), the license plate information may be acquired and transmitted to the user terminal (1015). If license plate information is unable to be acquired (e.g., information is blocked, blurred, or otherwise not visible), vehicle type information of the vehicle may be derived and transmitted to the user terminal (1014). Meanwhile, when the surrounding object is a person (1012), the controller may be configured to acquire and transmit identification information of the person (1016). In addition, when the surrounding object corresponds to an animal, other estimation may be performed to transmit the estimated information to the user terminal (1017).

The vehicle and control method thereof according to an exemplary embodiment may provide notification of an impact of the vehicle and information regarding an object causing the impact. Meanwhile, the disclosed exemplary embodiments may be embodied in the form of a recording medium storing instructions executable by a computer. The instructions may be stored in the form of program code and, when executed by a processor, may generate a program module to perform the operations of the disclosed exemplary embodiments. The recording medium may be embodied as a non-transitory computer-readable recording medium.

The non-transitory computer-readable recording medium includes all types of recording media in which instructions which can be decoded by a computer are stored, for example, a Read Only Memory (ROM), a Random Access Memory (RAM), a magnetic tape, a magnetic disk, a flash memory, an optical data storage device, and the like.

Although exemplary embodiments of the present invention have been described for illustrative purposes, those skilled in the art will appreciate that various modifications, additions and substitutions are possible, without departing from the scope and spirit of the disclosure. Therefore, exemplary embodiments of the present invention have not been described for limiting purposes.

What is claimed is:

1. A vehicle, comprising:
   a communication unit configured to communicate with a user terminal;
   a sensor configured to acquire distance information between the vehicle and at least one surrounding object and acceleration information of the vehicle;
   a camera configured to acquire a vehicle surrounding image; and
   a controller configured to start acquiring the vehicle surrounding image when the distance between the vehicle and the at least one surrounding object is less than a predetermined distance, acquire information regarding the at least one surrounding object approaching the vehicle and transmit the information regarding the at least one surrounding object to the user terminal,
   wherein when a plurality of surrounding objects are detected, the controller is configured to acquire information of one surrounding object determined to be closest to the vehicle and transmit the information of the one surrounding object to the user terminal.

2. The vehicle according to claim 1, wherein when the at least one surrounding object is a surrounding vehicle, the controller is configured to acquire license plate information of the surrounding vehicle and transmit the license plate information to the user terminal.

3. The vehicle according to claim 2, wherein when the controller fails to acquire license plate information of the surrounding vehicle, the controller is configured to acquire vehicle type information of the surrounding vehicle and transmit the vehicle type information to the user terminal.

4. The vehicle according to claim 1, wherein the controller is configured to acquire information of the at least one surrounding object located at a center of the surrounding image and transmit the information to the user terminal in response to determining that the vehicle and the at least one surrounding object will collide based on the acceleration information.

5. The vehicle according to claim 1, wherein when the at least one surrounding object includes a person, the controller is configured to acquire identification information of the person based on a facial expression included in the vehicle surrounding image and transmit the identification information to the user terminal.

6. The vehicle according to claim 1, wherein the controller is configured to determine a collision estimated location information of the vehicle based on the acceleration information and transmit the collision estimated location information and the information of the at least one surrounding object to the user terminal.

7. The vehicle according to claim 1, wherein the controller is configured to acquire the vehicle surrounding image until completion of parking of the vehicle in response to determining that the vehicle is in a parking state and output a message including an inquiry requesting an extension of a vehicle surrounding image acquisition time to the user terminal when a parking completion time of the vehicle exceeds a predetermined time range.

8. A control method of a vehicle, comprising:
   acquiring, by a controller, distance information between the vehicle and at least one surrounding object and acceleration information of the vehicle;
   acquiring, by the controller, a vehicle surrounding image;

starting acquiring, by the controller, the vehicle surrounding image when the distance between the vehicle and the at least one surrounding object is less than a predetermined distance;

acquiring, by the controller, information regarding the at least one surrounding object approaching the vehicle and transmitting the information regarding the at least one surrounding object to a user terminal; and acquiring, by the controller, information of one surrounding object determined to be closest to the vehicle when a plurality of surrounding objects are detected and transmitting the information of the one surrounding object to the user terminal.

9. The control method according to claim 8, further comprising:

when the at least one surrounding object is a surrounding vehicle, acquiring, by the controller, a license plate information of the surrounding vehicle and transmitting the license plate information to the user terminal.

10. The control method according to claim 9, further comprising:

when failing to acquire the license plate information of the surrounding vehicle, acquiring, by the controller, a vehicle type information of the surrounding vehicle and transmitting the vehicle type information to the user terminal.

11. The control method according to claim 8, further comprising:

acquiring, by the controller, information of the at least one surrounding object located at a center of the surrounding image and transmitting the information to the user terminal in response to determining that the vehicle and the at least one surrounding object will collide based on the acceleration information.

12. The control method according to claim 8, further comprising:

when the at least one surrounding object is determined to be a person, acquiring, by the controller, identification information of the person based on a facial expression included in the vehicle surrounding image and transmitting the identification information to the user terminal.

13. The control method according to claim 8, further comprising:

determining, by the controller, a collision estimated location information of the vehicle based on the acceleration information; and transmitting the collision estimated location information and the information of the surrounding object to the user terminal.

14. The control method according to claim 8, further comprising:

acquiring, by the controller, the vehicle surrounding image until a completion of parking of the vehicle in response to determining that the vehicle is in a parking state and outputting a message including an inquiry requesting an extension of a vehicle surrounding image acquisition time to the user terminal when a parking completion time of the vehicle exceeds a predetermined time range.

* * * * *